United States Patent [19]

Masten

[11] Patent Number: 5,187,375

[45] Date of Patent: Feb. 16, 1993

[54] OPTICAL OBJECT EDGE DETECTOR USING PARTIALLY COVERED REFERENCE SENSOR

[75] Inventor: Billy R. Masten, Shallowater, Tex.

[73] Assignee: Texas Instruments Incorporated, Dallas, Tex.

[21] Appl. No.: 626,119

[22] Filed: Dec. 11, 1990

[51] Int. Cl.⁵ .................. G01N 21/86; G01N 9/04
[52] U.S. Cl. .................. 250/561; 250/214 A
[58] Field of Search ........... 250/561, 571, 548, 557, 250/208.2, 210, 214 A, 214 L, 214 R

[56] References Cited

U.S. PATENT DOCUMENTS

| | | | |
|---|---|---|---|
| 3,681,605 | 8/1972 | Schmitt | 250/214 R |
| 3,751,667 | 8/1973 | Quittner | 250/214 B |
| 4,812,635 | 3/1989 | Kaufmann et al. | 250/210 |
| 4,878,753 | 11/1989 | Nestmeier | 250/561 |

Primary Examiner—David C. Nelms
Assistant Examiner—S. Allen
Attorney, Agent, or Firm—B. Peter Barndt; Richard L. Donaldson

[57] ABSTRACT

An edge detector includes a pair of integrated light sensors, a pair of log amplifiers and a comparator amplifier, having a hysteresis voltage applied thereto.

14 Claims, 2 Drawing Sheets

OPTICAL OBJECT EDGE DETECTOR USING PARTIALLY COVERED REFERENCE SENSOR

FIELD OF THE INVENTION

This invention relates to optic devices, and more particularly to an integrated set of at least two integrated sensor devices.

BACKGROUND OF THE INVENTION

Traditional approaches to edge detection consist of a single light source illuminating a single light detector across a path that is interrupted by the edge of the object. For use in electronic systems, it is necessary to define a light level threshold by which the location of the edge will be judged. Because of the variations in the transfer efficiencies from the input current of the light source to the output current of the sensor, this threshold is necessarily different from one device to another. The result is a cost problem, and perhaps a reliability problem. Also, since optical systems tend to vary over time, a system which works well during assembly may drift over time and/or temperature, thus causing a change in accuracy or a failure to recognize the edge entirely.

SUMMARY OF THE INVENTION

The invention is an optical edge detector using two or more optical sensor elements, at least one of which is use as a light level reference. Optical variations are reduced by using flat lens surfaces over both the light source and the light sensors. A log-amplifier is used that has a dynamic range in excess of 1000 to 1. The hysteresis of the amplifier does not depend on the value of light, but only on the displacement of the object casting a shadow on one of the light sensors.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
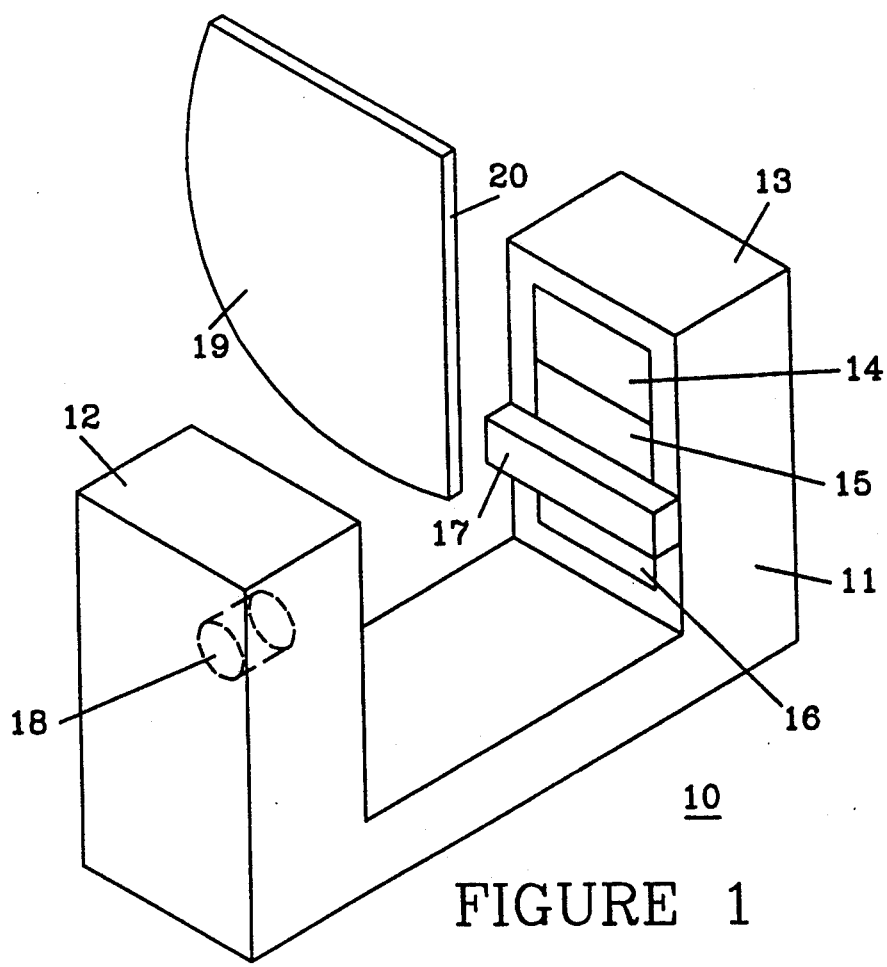
FIG. 1 illustrates an embodiment of the invention.

FIG. 1 illustrates an edge detector device 10 including a housing 11 having two vertical ends, 12 and 13. An object 19 is shown with an edge 20 moving into edge detector 10 between the two vertical ends 12 and 13.

Vertical end 12 houses a light source 18. Vertical end 13 houses an interrupt sensor 14, a reference sensor 16, and an integrated amplifier pair 15 and related circuits. A flat lens 17 is shown over reference sensor 16.

The effects of variation caused by the use of a single sensor can be overcome by using two or more sensors, when at least one of the sensors is used as a light level reference. The use of at least two sensors is effective only when characteristics are matched over temperature and time. Such matching is achieved by integrating the functions of the two sensors into a single piece of silicon.

Optical variations are reduced by using a flat lens over both the source and the sensor.

Dynamic range problems may occur in some systems. If a linear amplifier is used, high light levels may saturate the amplifier while low light levels are masked by noise. These effects are reduced in the present invention by using log amplifiers. The circuit of FIG. 2 has a dynamic range in excess of 1000 to 1.

There is a hysteresis associated with the displacement edge of object 19. With the use of the log amplifier of FIG. 2, a fixed percent reduction in light results in a fixed voltage reduction of the output. A hysteresis voltage fed back to the input of amplifier A3 (FIG. 2) results in a hysteresis related to displacement of the edge.

Figure 2:
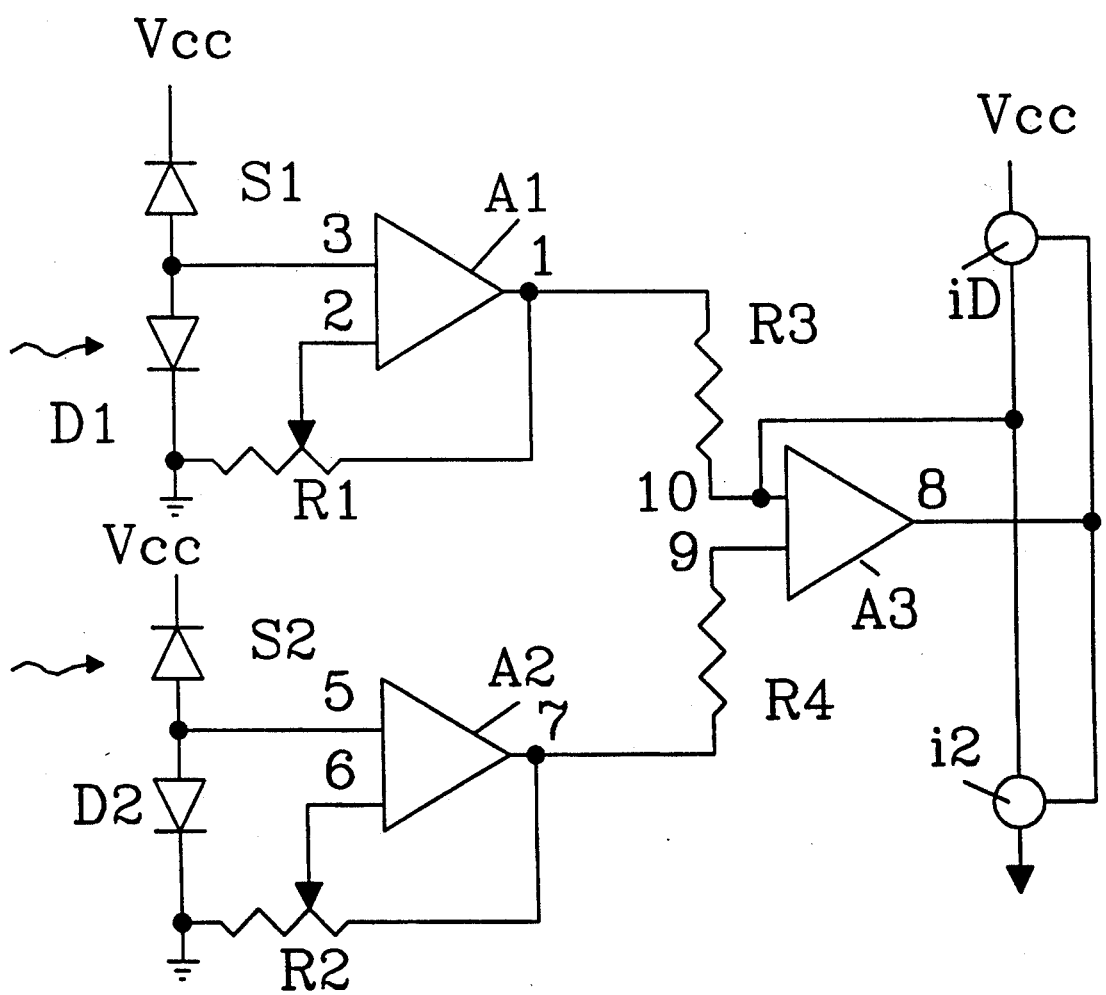
FIG. 2 is a circuit diagram of the light signal amplifier.

In FIG. 2, $S_1$, $D_1$ and $A_1$ constitute a sensor and log amplifier. $S_2$, $D_2$ and $A_2$ also constitute a sensor and log amplifier. When an equal amount of light is presented to both S1 and S2, the voltages at points 1 and 7 are equal. The output of each amplifier, $A_1$ and $A_2$, is approximated by the equation:

$$V = K*LN(M*P),$$

where K is a constant, M is a constant, and P is light power entering the sensor. Let $P_{max}$ be the amount of light entering the sensor when no obstruction (object) is present. If n% of the reference sensor $S_2$ were exposed, then the voltage at point 7 and 9 would be:

$$V_{ref} = K*LN(M*P_{max}*n)$$

$$V_{ref} = K*(LN(M*P_{max}) + LN(n))$$

$$V_{max} = k*LN(M*P_{max}$$

Thus when the object edge exposes 1/n of the light from $S_1$, the voltage at point 1 will equal the voltage at point 7, and the change in voltage at pin 1 from max to ref will be $$V_{max} - V_{ref} = -K*LN(n)$$

A 50% decrease in light produces a delta V of $-K*LN(0.5)$. Therefore, regardless of the value of $V_{max}$, $V_{ref}$ is 0.5 lower.

The hysteresis is implemented by the circuit as a current source $V_{cc}$ and a current sink to ground switched to produced an offset voltage at pin 10 equal to $\pm i*rl$.

If, for example, it were desired to switch point 8 from high to low when 45% of $S_1$ were exposed, and from low to high when 55% of $S_1$ were exposed, then i*rl could be calculated as follows:

$$V_{ref} = V(50) = K(LN(M*P_{max} + LN(0.5))$$

$$\begin{aligned}
\text{threshold low} = V(45) &= K(LN(M*.45*P_{max} \\
&= K*LN(M*P_{max}) + K*LN(.45) \\
\text{threshold high} = V(55) &= K(LN(M*.55*P_{max})) \\
&= K*LN(M*P_{max} + K*LN(.55)
\end{aligned}$$

$$V_{ref} - \text{threshold low} = K(LN(0.5) - LN(0.55))$$

Therefore i1rl = K(LN(0.5/0.55)).

In similar manner i2rl = K(LN(0.45/0.5)).

The important feature is that hysteresis does not depend on the value of light, but on the displacement of the object casting its shadow on $S_1$.

The following example is given in detecting an object edge by optical sensing.

The location of an object edge is related to light power and is given by the equation:

$$P = (W-D)/W * LH,$$

where:
H is light intensity
L is length of the sensor
d is displacement of object edge with respect to sensor
W is the sensor width
P is the light power
Voltage at Pin 1 (FIG. 2) is given by:

$$V = K \log A,$$

wherein A=MPY+C for purposes of this example C=0

$$V = K \log(MP)$$

$$V = K \log \left( M \frac{(W-D)}{W} LH \right)$$

$$V = K \log \frac{(M(W-D)LH)}{W}.$$

$$V = K (\log M + \log(W-D) + \log L + \log H - \log w)$$

$$V = K (\log (W-D) + \log M + \log L + \log H - \log w)$$

May be determined by setting D=0

$$V_1 = K(\log M + \log L + \log H)$$

Setting $D = \frac{W}{2}$ $$V_2 = K \left( \log \frac{W}{2} + \log M + \log L + \log H + \log W \right)$$

or
$$V_2 = K(-\log 2 + \log M + \log L + \log H)$$
$$V_1 - V_2 = \log 2)$$

$$K = \frac{V_1 - V_2}{\log 2}$$

with the value for $V_1=1.393$ mv, $V_2=1.318$ then K=0.249 therefore, $$1.318 = .249(-\log 2 + \log M + \log L = \log H)$$
$$-\log 2 + \log M + \log L + \log H = \frac{1.318}{.249} => \log =$$

$$\frac{1.318}{.249} + \log 2$$

$$\log \left( 2 \frac{MLH}{2} \right) = 5.293, \log MLH = 5.594$$

$$\frac{MLH}{2} = 196.3 \times 10^3$$

Thus, $V = 0.249(5.594 + \log(W-D) - \log W)$ or $V = .249 \left( 5.594 + \log \left( \frac{W-D}{W} \right) \right)$ if D is expressed a percentage of W, $$D = RW 0 \leq R \leq 100$$

then $V = .249 \left( 5.594 + \log \left( \frac{(1-R)W}{W} \right) \right)$ $$V = .249(5.594 + \log(1 - R))$$

if the intensity is changed from H to H/2, the change in voltage would be:

$$K(\log(W-D) + \log M + \log L + \log H - \log W)$$

or $$K \left( \log H - \log \frac{H}{2} \right)$$

K log 2, or for the example 0.249 log 2=0.749565 volts.

For a change in M or L or W−D/W of a similar degree would produce a change of 0.0749 volt.

As a further example, if fifty percent of the reference sensor, $S_2$ FIG. 2, is covered and if hysteresis is not used, the switch point will be at fifty percent coverage of the signal device, or 50 mils for a sensor of 100 mils length and 100 mv sensitivity. For a 5 mil hysteresis of motion the voltage produced would be $$V_1 - V_2 =$$

$.249(\log M + \log(W - 52.5) + \log L + \log H - \log W) -$
$.249(\log M + \log(W - 52.5) + \log L + \log H - \log W) =$ 1.08 mv.

Figure 3:
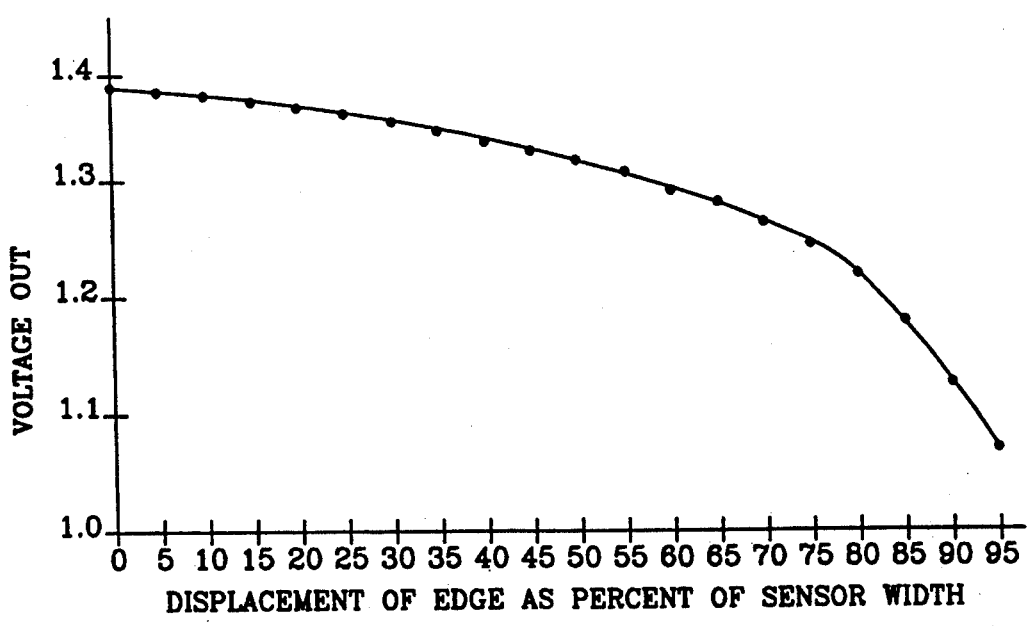
FIG. 3 illustrates a graph of VOLTAGE OUT vs DISPLACEMENT OF EDGE AS A PERCENT OF SENSOR WIDTH.

FIG. 3 illustrates voltage out at 1, FIG. 2, vs displacement of edge of an object as percent of sensor width using equations of the above example.

What is claimed is:
1. An optical object edge detector, comprising:
   a light source;
   an edge detector sensor;
   a partially covered reference light sensor to create a reference signal;
   a pair of amplifiers, each connected to one of the light sensors; and
   a third amplifier having it inputs connected directly to the outputs of said pair of amplifiers;
   wherein light from the light source is interrupted when the leading edge of a moving object passes between the light source and the light sensors, the same edge of the object interrupting the light to both light sensors.
2. The edge detector according to claim 1, wherein the pair of amplifiers are log amplifiers.

3. The edge detector according to claim 1, wherein an input to the third amplifier is used to create a constant voltage hysteresis.

4. The edge detector according to claim 1, wherein the light sensors are integrated into a common semiconductor substrate.

5. The edge detector according to claim 1, wherein the light sensors, the pair of amplifiers and said third amplifier are integrated into a common semiconductor substrate.

6. An optical object edge detector, comprising:
a light source;
a pair of light sensors, one of which is partially covered to create a reference signal;
a pair of amplifiers, each connected to one of said pair of light sensors; and
a third amplifier having it inputs connected directly to the outputs of said pair of amplifiers;
wherein light from the light source is interrupted when the leading edge of a moving object passes between the light source and the light sensors, the same edge of the object interrupting the light to both light sensors.

7. The edge detector according to claim 6, wherein the pair of amplifiers are log amplifiers.

8. The edge detector according to claim 6, wherein an input to the third amplifier is used to create a constant voltage hysteresis.

9. The edge detector according to claim 6, wherein the pair of light sensors are integrated into a common semiconductor substrate.

10. The edge detector according to claim 6, wherein the pair of light sensors, the pair of amplifiers and said third amplifier are integrated into a common semiconductor substrate.

11. An optical object edge detector, comprising:
a light source;
a pair of light sensors, a pair of amplifiers and a third amplifier integrated into a single semiconductor device;
each of said pair of amplifiers connected to one of said pair of light sensors, and said third amplifier having it inputs connected directly to the outputs of said pair of amplifiers;
wherein light from the light source is interrupted when the leading edge of a moving object passes between the light source and the light sensors, the same edge of the object interrupting the light to both light sensors.

12. The edge detector according to claim 11, wherein the pair of amplifiers are log amplifiers.

13. The edge detector according to claim 11, wherein the light sensor used as a reference sensor is partially covered to create a reference.

14. The edge detector according to claim 11, wherein an input to the third amplifier is used to create a constant voltage hysteresis.

* * * * *